Patented Sept. 24, 1940

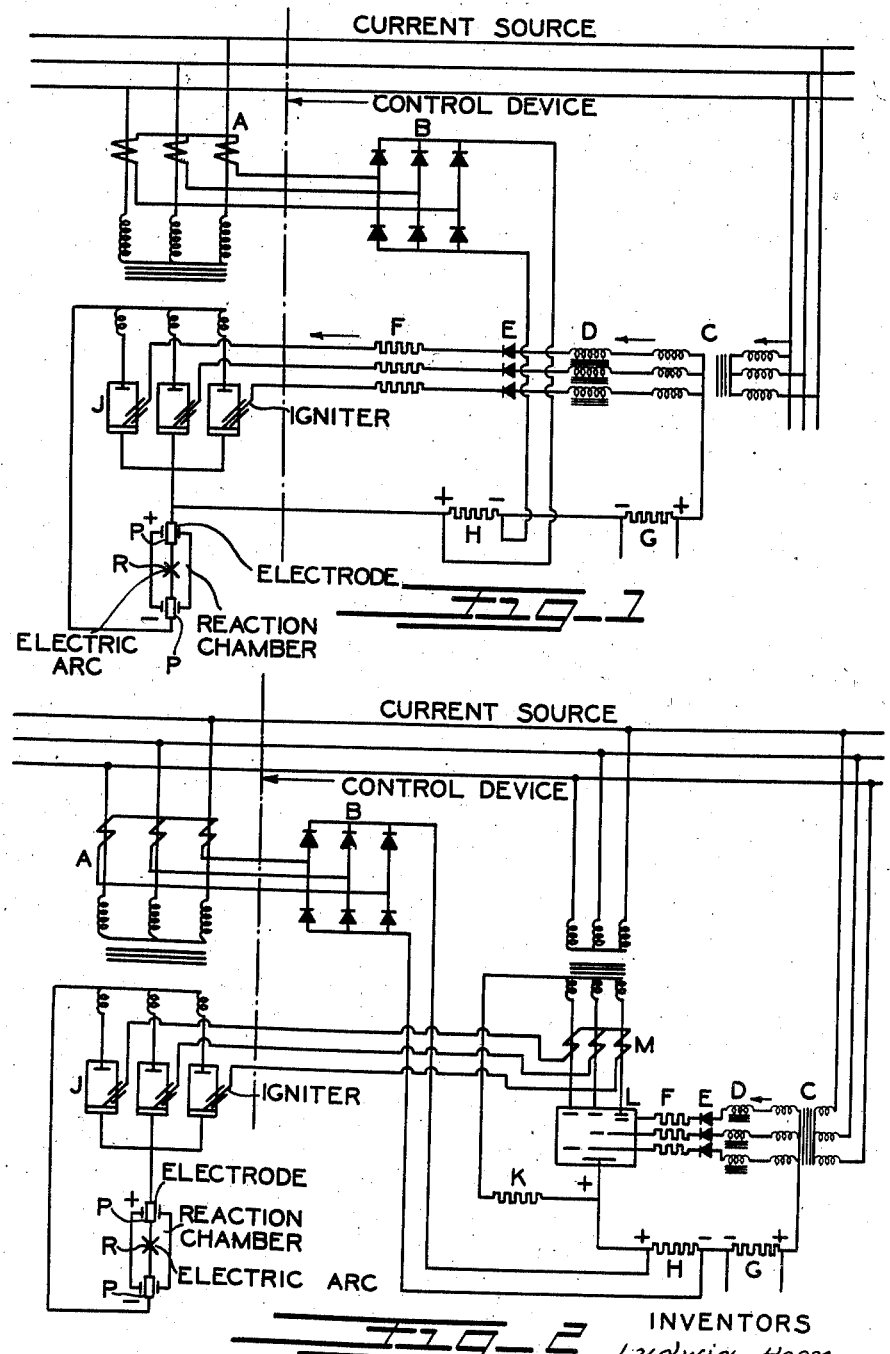

2,215,875

UNITED STATES PATENT OFFICE 2,215,875

APPARATUS FOR OPERATING DIRECT CURRENT ELECTRIC ARCS

Ludwig Heer, Ludwigshafen-on-the-Rhine, and Paul Baumann, Leuna, Germany, assignors, by mesne assignments, to Jasco, Incorporated, a corporation of Louisiana Application October 14, 1938, Serial No. 234,972
In Germany October 26, 1937

3 Claims. (Cl. 176—12)

The present invention relates to an improvement in or modification of a proposal for the operation of direct current electric arcs, for carrying out chemical reactions, according to which the electric arc is fed through a mercury arc rectifier, the voltage of which, for the purpose of stabilizing the arc, is automatically controlled by the electric arc current or the electric arc voltage by means of a grid situated in the neighborhood of the anodes which have a potential influenced by the electric arc superposed thereon by an inertialess control device or a control device working with only small inertia. This arrangement cannot, however, be directly used for rectifiers with immersion ignition (initial ignition) as the said rectifiers have no grid because the initiation of the discharge is effected by a controlled ignition device.

We have now found that the said rectifiers can also be used with advantage for stabilizing electric arcs if the ignition device be controlled by the automatically acting control device which works without inertia or with only a small inertia and which is controlled by the electric arc current or the electric arc voltage. A control device of the type hereinbefore specified is needed because the resistance of the electric arc changes only with a slight inertia.

Such a rectifier consists, for example in contrast to the grid-controlled mercury vapor rectifiers, of an anode with an immersion ignition device, both arranged in a simple cooled and evacuated discharge vessel and insulated from the same, and a mercury cathode in conducting connection with the vessel. For the rectification of polyphase current, several such units must either be arranged separately, or a number of such vessels, each with an anode and accompanying mercury cathode and immersion ignition device may be built into a vessel with common water cooling and pump. No exciter electric arc is necessary beside the immersion ignition device. The immersion ignition device, which consists for example of more or less well conducting substances, dips at the lower end into the cathode mercury, while the upper end is secured to a holder. When a voltage is applied to the immersion ignition device and a short-circuit current flows in the direction from the holder to the mercury, the main electric arc forms in a few $10^{-6}$ seconds. The accuracy of ignition is an essential feature of this apparatus.

The manner of working of such a mercury arc rectifier is as follows:

The cathode of an ordinary mercury vapor rectifier is continually in a state of emission by the exciter electric arc and the working of the anodes which are arranged in the same vessel, and the grid has the task of preventing the ignition of the single anodes until a certain time. In the rectifier with immersion ignition, however, the cathode is usually in a nonemitting state and the immersion ignition device has the task of initiating the ignition on the cathode side at a given time. The advantage resulting therefrom is the absence of grids in the current path of the discharge. The immersion ignitor does not in any way hinder the current path of the arc after it has been formed, whereas the grid does this and thus increases the fall in voltage across the electric arc by about 2 volts.

The said rectifiers with immersion ignition are quite specially suited for the construction of inertialess controls, automatically regulating the current, for the stable operation of direct current electric arcs for carrying out chemical reactions, because only a simple ignition impulse dependent on the main current need be given to the immersion ignition device of the rectifier vessel, which is insensitive to large current impulses, considerably more safe against back-ignition and simple in construction.

This may be attained for example in the following manner, reference being had to Figure 1 of the accompanying drawing:

The electric arc is created between the electrodes P arranged in a reaction vessel R through which the substances, for instance hydrocarbons such as methane, which are to be subjected to the reaction are conducted. The current for the ignition impulse is given by a transformer C and flows through a choke D, a valve E (so that only the positive half-wave acts) and a resistance F mercury arc to the rectifier J with immersion ignition. The choke D has a core of highly permeable material with a sharp saturation curve. The positive half-wave of the sine curve is thus deformed in such a way that a steep rise in voltage is formed, but the negative half-wave is suppressed by the action of the valve E. The dependency of the electric arc current is then obtained by superposing a direct current voltage dependent on the transformer C. The said direct current voltage is supplied from a transformer A in the primary circuit of the rectifier transformer through a rectifier B and is in the control circuit through a resistance H. Opposed to this there acts a constant positive voltage which is applied to the resistance G. Thus the zero line of the voltage of the transformer C is displaced in dependence on the main current. Since, however, a current can only flow in the direction of the immersion ignition device, it is only then that the choke D is magnetized and cuts out parts from the voltage. The choke D possess a core of a material having a very slight magnetizing current, i. e., they already deform, upon slight ignition currents, the alternating ignition voltage of the transformer C to the effect that a steep ascension of the ignition impulse is attained. The chokes D for the formation of their magnetic field up to saturation always require the same energy. The portion cut out from the ignition voltage is proportional to this energy, i. e., if the zero line of the alternating ignition voltage be displaced, then from the original sine-curve of the alternating ignition voltage equiareal portions are cut out. The time at which the ignition impulse is initiated is thus only dependent on the displacement of the zero line of the alternating ignition voltage, i. e., on the control voltage of the resistance H. The zero line of the alternating ignition voltage is thus identified by the difference between the positive voltage of the resistance G and the pilot direct voltage of the resistance H. For the reason that the portions cut out from the alternating ignition voltage, upon the displacement of the zero line by the main current, are always equal in area, the zero line of the alternating ignition voltage, if the control voltage of the resistance H is raised but the positive voltage of the resistance G remains constant, is shifted upwards, i. e., the steep ascension of the alternating ignition voltage takes place at a later moment, and therefore the internal igniter gets its ignition impulse later and the direct voltage is reduced. The converse procedure takes place if the control voltage which is proportional with the electric arc current falls off. If the control voltage of the resistance H falls, the zero line of the alternating ignition voltage is shifted downwards. The steep ascension in the original sine-curve of the alternating ignition voltage takes place at an earlier moment, since the cutout portions always remain of equal area, the internal igniter gets its ignition impulse at an earlier moment, the anode is ignited at an earlier moment and the direct voltage is raised.

Another apparatus with which for example an inertialess control of the direct current voltage in dependence on the current can be obtained is shown diagrammatically in Figure 2.

A direct current voltage proportional to the electric arc current is again obtained through a transformer A and a rectifier B, and this is supplied to an auxiliary ignition circuit. This auxiliary circuit consists of a small glass rectifier L with the same number of anodes as the main rectifier which is loaded on a resistance K. This auxiliary rectifier contains a control circuit which consists of a transformer C, chokes, D, valves E and resistances F. In the neutral point of the grid transformer C the alternating voltage is superposed by the control voltage and opposed to this by a constant positive voltage, i. e., the neutral point of the grid alternating voltage is displaced in dependence on the main current. The control voltage and the constant positive voltage are applied to the resistances H and G. Chokes D effect a steep rise in the positive half-waves of the grid alternating voltage. By displacing the zero line of the grid alternating voltage, there are thus, as in the arrangement according to Figure 1, cut out from the grid alternating voltage parts of equal surface, i. e., the positive ignition impulse of the auxiliary rectifier takes place in dependence on the main current at different times. Consequently, however, the anode current of the auxiliary rectifier L also changes, i. e., the anode current of the auxiliary rectifier withdrawn from the transformer M and yielding the ignition current for the rectifier with immersion ignition device effects an initial ignition of the main rectifier J which initial ignition is dependent on the main current and which takes place at different times of the half-wave of the anode voltage.

Arrangements having similar actions may be obtained also with electron tubes alone or in conjunction with photo-cells.

What we claim is:

1. An apparatus for operating direct current electric arcs, which comprises electrodes for such arcs, a mercury arc rectifier having immersion ignition, an alternating current source connected with the said electrodes by way of the said rectifier and an ignition device for the rectifier and electrical means acting automatically and without substantial inertia for controlling said ignition device.

2. Apparatus according to claim 1 in which said electrical means for controlling the ignition device includes a main alternating current source of alternating current connected to said rectifier for effecting ignition thereof, a circuit cut into said connection for imposing direct current onto said alternating current proportional to the main current and a choke in said connection for deforming the positive half-wave of the alternating current to displace the zero line of the alternating current of the ignition device.

3. Apparatus according to claim 1 in which said electrical means for controlling the ignition device includes an auxiliary rectifier and grids influenced by the current of the arc for controlling variable anode impulses of said auxiliary rectifier.

LUDWIG HEER.
PAUL BAUMANN.